United States Patent [19]

Tal

[11] Patent Number: 5,871,816
[45] Date of Patent: Feb. 16, 1999

[54] METALLIZED TEXTILE

[75] Inventor: Meirav Tal, Efrat, Israel

[73] Assignee: MTC Ltd., Jerusalem, Israel

[21] Appl. No.: 693,656

[22] Filed: Aug. 9, 1996

[51] Int. Cl.⁶ .................................................. B05D 3/10
[52] U.S. Cl. .......................... 427/304; 427/305; 427/306; 427/443.1
[58] Field of Search ................................... 427/304, 305, 427/306, 443.1

[56] References Cited

U.S. PATENT DOCUMENTS

| | | | |
|---|---|---|---|
| 252,524 | 1/1882 | Sagendorf | 442/68 |
| 1,210,375 | 12/1916 | Decker | 442/91 |
| 3,119,709 | 1/1964 | Atkinson | 427/306 |
| 3,308,488 | 3/1967 | Schoonman | 5/335 |
| 3,385,915 | 5/1968 | Hamling | 264/5 |
| 3,663,182 | 5/1972 | Hamling | 23/355 |
| 3,686,019 | 8/1972 | Ohfuka et al. | 117/47 R |
| 3,769,060 | 10/1973 | Ida et al. | 117/37 R |
| 3,860,529 | 1/1975 | Hamling | 252/301.1 R |
| 4,072,784 | 2/1978 | Cirino et al. | 428/507 |
| 4,103,450 | 8/1978 | Whitcomb | 43/131 |
| 4,115,422 | 9/1978 | Welch et al. | 260/429.3 |
| 4,174,418 | 11/1979 | Welch et al. | 428/264 |
| 4,219,602 | 8/1980 | Conklin | 428/244 |
| 4,291,086 | 9/1981 | Auten | 428/242 |
| 4,292,882 | 10/1981 | Clausen | 89/36 A |
| 4,317,856 | 3/1982 | Huthelker et al. | 428/273 |
| 4,366,202 | 12/1982 | Borovsky | 428/283 |
| 4,390,585 | 6/1983 | Holden | 428/172 |
| 4,525,410 | 6/1985 | Hagiwara | 428/198 |
| 4,666,940 | 5/1987 | Bischoff et al. | 514/544 |
| 4,716,055 | 12/1987 | Sanders et al. | 427/304 |
| 4,769,275 | 9/1988 | Inagaki et al. | 428/240 |
| 4,835,019 | 5/1989 | White et al. | 427/387 |
| 4,900,765 | 2/1990 | Murabayashi et al. | 523/122 |
| 4,983,573 | 1/1991 | Bolt et al. | 505/1 |
| 5,009,946 | 4/1991 | Hatomoto et al. | 428/87 |
| 5,024,875 | 6/1991 | Hill et al. | 428/267 |
| 5,143,769 | 9/1992 | Moriya et al. | 428/76 |
| 5,175,040 | 12/1992 | Harpell et al. | 428/113 |
| 5,200,256 | 4/1993 | Dunbar | 428/212 |
| 5,227,365 | 7/1993 | Van Den Sype | 505/1 |
| 5,254,134 | 10/1993 | Zhao et al. | 8/120 |
| 5,395,651 | 3/1995 | Sodervall et al. | 427/306 |
| 5,518,812 | 5/1996 | Mitchnick et al. | 428/357 |

OTHER PUBLICATIONS

"Encyclopedia of Polymer Science and Technology", John Wiley & Sons, Inc., vol. 8, pp. 651–666 and vol. 9, pp. 580–598, 1968. (no month).

Marino, A. et al, "Electrochemical Properties of Silver–Nylon Fabrics", J. Electrochem. Soc. vol. 132, No. 1, pp. 68–72, (Jan. 1985).

*Primary Examiner*—Shrive Beck
*Assistant Examiner*—Timothy Meeks
*Attorney, Agent, or Firm*—Mark M. Friedman

[57] ABSTRACT

A process for activating a textile to catalyze the reduction of a metal cation, a process for metallizing the activated textile with the reduced metal, and the activated textile and metallized textile thereby produced. The textile is activated by precipitating noble metal nucleation sites on the fibers of the textile. Immersing the activated textile in a suitably prepared solution of a metal cation, and adding a reducing agent, leads to the formation of a metal plating tightly and intimately bonded to the fibers of the textile.

23 Claims, No Drawings

METALLIZED TEXTILE

FIELD AND BACKGROUND OF THE INVENTION

The present invention relates to textiles and, more particularly, to a method for binding a full or partial metal plating to the fibers of a textile, and the metallized textile thereby produced.

There are a variety of applications for which a textile with a full or partial metal or metal oxide plating bonded to the fibers thereof would be useful. These include:

1. Acaricide

Beds commonly are infested by tiny mites. These mites eat bacteria and fungi that grow on epidermal scales shed by people who sleep in the beds. Fragments of dead mites, and mite excreta, are allergens, to which asthmatics and people with dust allergens are sensitive. It has been found that some metals and metal oxides, notably Cu, CuO, Ag and $Ag_2O$, repel mites.

The conventional method for making textiles inhospitable to mites is to treat the textiles with an organic acaricide such as benzyl benzoate. For example, Bischoff et al., in U.S. Pat. No. 4,666,940, teach an acaricide that includes benzyl benzoate and a solid powder carrier whose particles are of a size suitable for ingestion by the mites. These acaricides must be replaced every time the textile is laundered. Thus, Bischoff et al. recommend using their acaricide on textiles, such as carpets and upholstery, that are not laundered frequently. An inherently acaricidal bedsheet would keep a bed free of mites, even after multiple launderings, without the need to reapply acaricide to the bedsheet.

2. Bactericide and Fungicide

Some metal oxides, notably ZnO, are well known as fungicides. Before the introduction of antibiotics to medicine, silver metal sometimes was used as a bactericide and bacteriostat. Textiles with inherent bactericidal and fungicidal properties have obvious applications in settings, such as hospitals and similar institutions, where it is important to maintain aseptic conditions.

Bactericidal agents used heretofore in textiles include complexes of zirconyl acetate with inorganic peroxides (Welch et al., U.S. Pat. No. 4,115,422), metal cations contained in zeolite particles (Hagiwara et al., U.S. Pat. No. 4,525,410), and quaternary ammonium salts (White et al., U.S. Pat. No. 4,835,019; Hill et al., U.S. Pat. No. 5,024,875; Zhao et al., U.S. Pat. No. 5,254,134). These are not totally satisfactory, being specific to a particular textile (such as the polyamide yarn of White et al.), or being subject to eventual loss of activity by chemical decomposition, a process often hastened by laundering.

The methods known in the prior art for bonding a metal or a metal oxide to a textile generally require that the metal or its oxide be bonded indirectly to the textile. For example, the metal may be reduced to a powder and suspended in a binder. The binder metal mixture then is applied to the textile, with the binder, and not the metal, bonding to the textile. Alternatively, the metal is reduced to a powder, an adhesive is applied to the textile, and the metal powder is spread on the adhesive. Examples of both such methods may be found in U.S. Pat. No. 1,210,375, assigned to Decker. These methods are less than satisfactory for the above applications, for at least two reasons. First, the carrier or adhesive may entirely encapsulate the metal or metal oxide powder particles, inhibiting their contact with mites, fungi, and bacteria, and making the textile useless as an acaricide, fungicide, or bactericide. Second, multiple launderings tends to weaken the binder or adhesive and loosen or remove the particles.

Two notable exceptions to the general rule that metals and metal oxides have not heretofore been bonded directly to textiles are nylon textiles and polyester textiles, which may be plated with metals using standard electroless plating processes for plating plastics. The specific electroless plating methods known to the art are restricted in their applicability to only certain plastics, however. In particular, they are not suited to natural fibers, nor to most synthetic fibers.

There is thus a widely recognized need for, and it would be highly advantageous to have, a textile with a full or partial metal or metal oxide plating directly and securely bonded to the fibers thereof, for use in the applications listed above.

SUMMARY OF THE INVENTION

According to the present invention there is provided a process for activating a textile, comprising the steps of: (a) selecting the textile which includes fibers selected from the group consisting of natural fibers, synthetic cellulosic fibers, regenerated protein fibers, acrylic fibers, polyolefin fibers, polyurethane fibers, vinyl fibers, and blends thereof; (b) soaking the textile in a solution containing at least one reductant cationic species having at least two positive oxidation states, the at least one reductant cationic species being in a lower of the at least two positive oxidation states; and (c) soaking the textile in a solution containing at least one noble metal cationic species.

According to the present invention there is provided a process for metallizing a textile, comprising the steps of: (a) selecting the textile which contains fibers selected from the group consisting of natural fibers, synthetic cellulosic fibers, regenerated protein fibers, acrylic fibers, polyolefin fibers, polyurethane fibers, vinyl fibers, and blends thereof; (b) soaking the textile in a solution containing at least one reductant cationic species having at least two positive oxidation states, the at least one cationic species being in a lower of the at least two positive oxidation states; (c) soaking the textile in a solution containing at least one noble metal cationic species, thereby producing an activated textile; and (d) reducing at least one oxidant cationic species in a medium in contact with the activated textile, thereby producing a metallized textile.

According to the present invention there is provided a composition of matter comprising: (a) a textile including fibers selected from the group consisting of natural fibers, synthetic cellulosic fibers, regenerated protein fibers, acrylic fibers, polyolefin fibers, polyurethane fibers, vinyl fibers, and blends thereof; and (b) a plating including materials selected from the group consisting of metals and metal oxides; the composition of matter characterized in that the plating is bonded directly to the fibers.

According to the present invention there is provided a composition of matter comprising: (a) a textile including fibers selected from the group consisting of natural fibers, synthetic cellulosic fibers, regenerated protein fibers, acrylic fibers, polyolefin fibers, polyurethane fibers, vinyl fibers, and blends thereof; and (b) a plurality of nucleation sites, each of the nucleation sites including at least one noble metal; the composition of matter characterized in that the nucleation sites are bonded directly to the fibers.

According to the present invention there is provided a composition of matter comprising: (a) a textile including fibers selected from the group consisting of natural fibers, synthetic cellulosic fibers, regenerated protein fibers, acrylic fibers, polyolefin fibers, polyurethane fibers, vinyl fibers, and blends thereof; and (b) a plurality of nucleation sites, each of the nucleation sites including at least one noble metal; the composition of matter characterized by catalyzing the reduction of at least one metallic cationic species to a reduced metal, thereby plating the fibers with the reduced metal.

In the context of the present invention the term "textile" includes fibers, whether natural (for example, cotton, silk, wool, and linen) or synthetic, yarns spun from those fibers, and woven, knit, and non-woven fabrics made of those yarns. The scope of the present invention includes all natural fibers; and all synthetic fibers used in textile applications, including but not limited to synthetic cellulosic fibers (i.e., regenerated cellulose fibers such as rayon, and cellulose derivative fibers such as acetate fibers), regenerated protein fibers, acrylic fibers, polyolefin fibers, polyurethane fibers, and vinyl fibers, but excluding nylon and polyester fibers; and blends thereof.

The present invention is an adaptation of technology used in the electroless plating of plastics, particularly printed circuit boards made of plastic, with metals. See, for example, Encyclopedia of Polymer Science and Engineering (Jacqueline I. Kroschwitz, editor), Wiley and Sons, 1987, vol. IX, pp 580–598. As applied to textiles, this process includes two steps. The first step is the activation of the textile by precipitating catalytic noble metal nucleation sites on the textile. This is done by first soaking the textile in a solution of a low oxidation state reductant cation, and then soaking the textile in a solution of noble metal cations, preferably a solution of $Pd^{++}$ cations, most preferably an acidic $PdCl_2$ solution. The low oxidation state cation reduces the noble metal cations to the noble metals themselves, while being oxidized to a higher oxidation state. Preferably, the reductant cation is one that is soluble in both the initial low oxidation state and the final high oxidation state, for example $Sn^{++}$, which is oxidized to $Sn^{++++}$, or $Ti^{+++}$, which is oxidized to $Ti^{++++}$. The scope of the present invention includes this process of activation as a separate process in its own right.

The second step is the reduction, in close proximity to the activated textile, of a metal cation whose reduction is catalyzed by a noble metal. Examples of such cations include $Cu^{++}$, $Ag^+$, $Zn^{++}$ and $Ni^{++}$. The reducing agents used to reduce the cations typically are molecular species, for example, formaldehyde in the case of $Cu^{++}$, and hydrazine hydrate in the case of $Ag^{+++}$. Because the reducing agents are oxidized, the metal cations are termed "oxidant cations" herein. After these oxidant cations are plated on the textile, the metal plating may be processed further, for example, by oxidation to the oxide. This oxidation is most conveniently effected simply by exposing the metallized textile to air.

The scope of the present invention includes the metallized textiles, the oxide-plated textiles obtained by oxidizing the metallized textiles, and the intermediate activated textiles, as innovative compositions of matter in their own right. The metallized textiles and the oxide-plated textiles of the present invention are characterized in that their metal or metal oxide plating is bonded directly to the textile fibers. The plating may cover substantially all of the fiber surfaces, or may cover only part of the surfaces. Similarly, the activated textiles of the present invention are characterized in that their noble metal nucleation sites are bonded directly to the textile fibers. The activated textiles of the present invention also are characterized by their ability to catalyze the reduction of appropriate metallic cationic species, thereby plating themselves with the reduced metal.

DESCRIPTION OF THE PREFERRED EMBODIMENTS

The present invention is of a process for binding a full or partial metallic plating to a textile, and of the metallized textiles thereby produced. Specifically, the present invention can be used to make textiles with metal and metal oxide coatings intimately and permanently bonded to the fibers of those textiles.

The principles and operation of a process for plating a textile with a metal according to the present invention may be better understood with reference to the following Examples. These Examples are illustrative, and should not be construed to restrict the scope of the present invention in any way.

EXAMPLE 1

A dilute acidic solution of $SnCl_2$ was prepared by dissolving $SnCl_2$ and concentrated HCl in water.

An dilute acidic solution of $PdCl_2$ was prepared by dissolving $PdCl_2$ and concentrated HCl, and water.

An 8"×3" cotton swatch was activated as follows:

Soak in a bath of the $SnCl_2$ solution.

Soak in a bath of the $PdCl_2$ solution.

A dilute basic $CuSO_4$ solution was prepared by dissolving $CuSO_4$ and NaOH (in approximately equal weight proportions), a chelating agent, and polyethylene glycol in water.

The activated cotton swatch and formaldehyde were added to the $CuSO_4$ solution under a pure oxygen atmosphere. After between 2 minutes and 10 minutes, the cotton swatch was removed.

The palladium deposited on the cotton swatch in the activation step catalyzed the reduction of the $Cu^{++}$ by the formaldehyde, providing a layer of copper tightly and intimately bonded to the fibers of the cotton swatch. The swatch, which initially was white in color, now was the color of copper metal, while retaining the flexibility and physical characteristics of the original fabric. The metallic copper color remained unchanged after several launderings.

EXAMPLE 2

An 8"×3" cotton swatch was activated as in Example 1. A dilute solution of $AgNO_3$ was prepared by dissolving $AgNO_3$, concentrated $NH_4OH$, and glacial acetic acid in water. The volume ratio of concentrated $NH_4OH$ to glacial acetic acid was about 1.7 to 1.

The activated cotton swatch, and dilute aqueous hydrazine hydrate, were added to the $AgNO_3$ solution. After 10 minutes, the cotton swatch was removed.

The palladium deposited on the cotton swatch in the activation step catalyzed the reduction of the $Ag^+$ by the hydrazine hydrate, providing a partially oxidized layer of silver tightly and intimately bonded to the fibers of the cotton swatch. The swatch, which initially was white in color, now was dark gray. The dark gray color remained unchanged after several launderings.

While the invention has been described with respect to a limited number of embodiments, it will be appreciated that many variations, modifications and other applications of the invention may be made.

What is claimed is:

1. A process for activating a textile, comprising the steps of:
   (a) selecting a textile which includes natural fibers;
   (b) soaking the textile in a solution containing at least one reductant cationic species having at least two positive oxidation states, said at least one reductant cationic species being in a lower of said at least two positive oxidation states; and
   (c) soaking the textile in a solution containing at least one noble metal cationic species.

2. The process of claim 1, wherein said at least one noble metal cationic species includes $Pd^{++}$.

3. The process of claim 1, wherein said at least one reductant cationic species is selected from the group consisting of $Sn^{++}$ and $Ti^{+++}$.

4. The process of claim 3, wherein said reductant cationic species solution is aqueous.

5. The process of claim 4, wherein said reductant cationic species solution is acidic.

6. The process of claim 5, wherein said at least one reductant cationic species includes $Sn^{++}$.

7. The process of claim 1, wherein said noble metal solution is aqueous.

8. The process of claim 7, wherein said noble metal solution is acidic.

9. A process for metallizing a textile, comprising the steps of:
   (a) selecting a textile which contains natural fibers;
   (b) soaking the textile in a solution containing at least one reductant cationic species having at least two positive oxidation states, said at least one cationic species being in a lower of said at least two positive oxidation states;
   (c) soaking the textile in a solution containing at least one noble metal cationic species, thereby producing an activated textile; and
   (d) reducing at least one oxidant cationic species in a medium in contact with said activated textile, thereby producing a metallized textile.

10. The process of claim 9, wherein said reduction of said at least one oxidant cationic species is effected under an oxygen atmosphere.

11. The process of claim 9, wherein said at least one noble metal cationic species includes $Pd^{++}$.

12. The process of claim 9, wherein said reductant cationic species is selected from the group consisting of $Sn^{++}$ and $Ti^{+++}$.

13. The process of claim 12, wherein said reductant cationic species solution is aqueous, and wherein said at least one reductant cationic species is $Sn^{++}$.

14. The process of claim 9, wherein said noble metal solution is aqueous.

15. The process of claim 9, wherein said at least one oxidant cationic species is selected from the group consisting of $Cu^{++}$, $Ag^+$, $Zn^{++}$ and $Ni^{++}$.

16. The process of claim 9, wherein said reducing of said at least one oxidant cationic species in said medium in contact with said activated textile includes the steps of:
   (i) placing said activated textile in a solution of said at least one oxidant cationic species; and
   (ii) adding at least one reducing agent to said solution of said at least one oxidant cationic species.

17. The process of claim 16, wherein said at least one oxidant cationic species is selected from the group consisting of $Cu^{++}$, $Ag^+$, $Zn^{++}$ and $Ni^{++}$.

18. The process of claim 17, wherein said at least one oxidant cationic species includes $Cu^{++}$, and wherein said at least one reducing agent includes formaldehyde.

19. The process of claim 17, wherein said at least one oxidant cationic species includes $Ag^+$, and wherein said at least one reducing agent includes hydrazine hydrate.

20. The process of claim 9, further comprising the step of oxidizing the metallized textile.

21. The process of claim 20, wherein said oxidizing is effected by exposing the metallized textile to air.

22. A process for activating a textile, comprising the steps of:
   (a) selecting a textile, in a form selected from the group consisting of yarn and fabric, said textile including fibers selected from the group consisting of natural fibers, synthetic cellulosic fibers, regenerated protein fibers, acrylic fibers, polyolefin fibers, polyurethane fibers, vinyl fibers, and blends thereof;
   (b) soaking said textile in a solution containing at least one reductant cationic species having at least two positive oxidation states, said at least one reductant cationic species being in a lower of said at least two positive oxidation states; and
   (c) soaking said textile in a solution containing at least one noble metal cationic species.

23. A process for metallizing a textile, comprising the steps of:
   (a) selecting a textile, in a form selected from the group consisting of yarn and fabric, said textile including fibers selected from the group consisting of natural fibers, synthetic cellulosic fibers, regenerated protein fibers, acrylic fibers, polyolefin fibers, polyurethane fibers, vinyl fibers, and blends thereof;
   (b) soaking said textile in a solution containing at least one reductant cationic species having at least two positive oxidation states, said at least one cationic species being in a lower of said at least two positive oxidation states;
   (c) soaking said textile in a solution containing at least one noble metal cationic species, thereby producing an activated textile; and
   (d) reducing at least one oxidant cationic species in a medium in contact with said activated textile, thereby producing a metallized textile.

* * * * *